(12) United States Patent
Oikawa et al.

(10) Patent No.: US 7,105,239 B2
(45) Date of Patent: Sep. 12, 2006

(54) PERPENDICULAR MAGNETIC RECORDING MEDIUM AND MAGNETIC RECORDING/REPRODUCING APPARATUS USING THE SAME

(75) Inventors: Soichi Oikawa, Chiba (JP); Takashi Hikosaka, Tokyo (JP); Futoshi Nakamura, Ichikawa (JP); Takeshi Iwasaki, Funabashi (JP); Hiroshi Sakai, Ichihara (JP); Akira Sakawaki, Ichihara (JP); Kenji Shimizu, Chiba (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 0 days.

(21) Appl. No.: 10/234,856

(22) Filed: Sep. 5, 2002

(65) Prior Publication Data

US 2003/0099869 A1    May 29, 2003

(30) Foreign Application Priority Data

Nov. 27, 2001    (JP) .............................. 2001-361217

(51) Int. Cl.
*G11B 5/66* (2006.01)
*G11B 5/70* (2006.01)

(52) U.S. Cl. ................................. 428/828.1
(58) Field of Classification Search ................ 428/828, 428/828.1
See application file for complete search history.

(56) References Cited

U.S. PATENT DOCUMENTS

| | | | |
|---|---|---|---|
| 4,544,591 A | 10/1985 | Uesaka et al. | |
| 4,672,009 A | 6/1987 | Takahashi | |
| 5,635,835 A | 6/1997 | Mouchot et al. | |
| 5,792,564 A | 8/1998 | Hikosaka et al. | 428/610 |
| 5,815,342 A * | 9/1998 | Akiyama et al. | 360/97.01 |
| 5,942,342 A | 8/1999 | Hikosaka et al. | |
| 6,818,330 B1 * | 11/2004 | Shukh et al. | 428/694 TM |
| 6,835,475 B1 * | 12/2004 | Carey et al. | 428/694 TS |
| 6,858,319 B1 * | 2/2005 | Yasui et al. | 428/611 |
| 2002/0136930 A1 | 9/2002 | Oikawa et al. | |
| 2003/0017370 A1 | 1/2003 | Shimizu et al. | |

FOREIGN PATENT DOCUMENTS

| | | |
|---|---|---|
| EP | 0 726 563 A1 | 8/1996 |
| JP | 59-63026 | 4/1984 |
| JP | 5-258274 | 10/1993 |
| JP | 6-28652 | 2/1994 |
| JP | 7-129946 | 5/1995 |
| JP | 7-235034 | 9/1995 |
| JP | 2001-118234 | 4/2001 |

OTHER PUBLICATIONS

Office Action, dated Apr. 20, 2004, from the Japanese Patent Office for Patent Application No. 2001-361217.
U.S. Appl. No. 10/151,898, filed May 22, 2002, Shimizu et al.

(Continued)

*Primary Examiner*—Holly Rickman
(74) *Attorney, Agent, or Firm*—Pillsbury Winthrop Shaw Pittman, LLP (57) ABSTRACT

In a magnetic recording medium, a longitudinal hard magnetic layer, interlayer, longitudinal soft magnetic layer, and magnetic recording layer are multilayered on a substrate. The interlayer is one of a magnetic layer having saturation magnetization smaller than that of the longitudinal hard magnetic layer, a nonmagnetic layer mainly containing cobalt or ruthenium or having a thickness of 0.5 nm or less, and an oxide layer of the longitudinal hard magnetic layer.

20 Claims, 6 Drawing Sheets

OTHER PUBLICATIONS

U.S. Appl. No. 10/101,949, filed Mar. 20, 2002, Oikawa et al.

* cited by examiner

PERPENDICULAR MAGNETIC RECORDING MEDIUM AND MAGNETIC RECORDING/REPRODUCING APPARATUS USING THE SAME

CROSS-REFERENCE TO RELATED APPLICATIONS

This application is based upon and claims the benefit of priority from the prior Japanese Patent Application No. 2001-361217, filed Nov. 27, 2001, the entire contents of which are incorporated herein by reference.

BACKGROUND OF THE INVENTION

1. Field of the Invention

The present invention relates to a perpendicular magnetic recording type magnetic recording/reproducing apparatus and a perpendicular magnetic recording medium used in the apparatus.

2. Description of the Related Art

Conventionally, in a perpendicular double-layered medium in which a perpendicular magnetic recording layer is multilayered on a high-permeability soft magnetic layer, this soft magnetic layer takes part of the function of a recording head, i.e., passes a recording magnetic field, which is generated from a magnetic head and which magnetizes the perpendicular magnetic recording layer, in the horizontal direction and returns this magnetic field to the magnetic head, thereby improving the recording/reproduction efficiency. On the other hand, the soft magnetic layer readily forms magnetic domains because it reduces the magnetostatic energy. A magnetic wall is formed in the boundary between these magnetic domains, and spike noise is generated in a region in which this magnetic wall exists. To suppress this spike noise, it is only necessary to suppress the formation of the magnetic wall in the soft magnetic layer. As a method of suppressing the formation of this magnetic wall, as described in, e.g., Jpn. Pat. Appln. KOKAI Publication No. 5-258274, a large number of media have been proposed in which a hard magnetic layer is formed below a soft magnetic layer to fix the direction of easy magnetization in this soft magnetic layer in the radial direction.

In these media, however, the soft magnetic layer is directly formed on the hard magnetic layer, so the exchange coupling interaction acts more than necessary between these layers. The soft magnetic layer largely changes the magnetization direction even when applied with a weak external magnetic field of, e.g., about 7,900 A/m.

In this case, the stronger the coupling with the soft magnetic layer, the more easily the hard magnetic layer is influenced by the soft magnetic layer. As a consequence, the magnetization direction, i.e., the direction of the easy axis in the hard magnetic layer changes from the radius direction. That is, a so-called pinning failure phenomenon occurs. In effect, in a magnetic recording/reproducing device (HDD) a voice coil motor (VCM) which uses a permanent magnet to drive an arm is positioned close to a magnetic disk. A leakage flux generated from this VCM has a magnitude of about 7,900 A/m even in the vicinity of the edge of the magnetic disk. Therefore, if the above-mentioned medium is used in the HDD, pinning failure sometimes occurs as a particularly serious problem.

The use of the hard magnetic layer is convenient to control the direction of the easy axis in the soft magnetic layer. However, the hard magnetic layer is basically the same as a longitudinal magnetic recording medium, i.e., it generates medium noise. The thickness of the soft magnetic layer is preferably small in order to prevent the generation of dust during film formation and reduce the cost. However, the smaller the thickness of the soft magnetic layer and the shorter the distance between the hard magnetic layer and the magnetic head, the larger the noise from the hard magnetic layer. One means for reducing the noise from this hard magnetic layer is to reduce its thickness. Reducing the thickness of the hard magnetic layer is also advantageous in improving the film formation process and in the cost. If, however, the exchange coupling acts strongly, pinning failure easily occurs.

BRIEF SUMMARY OF THE INVENTION

The present invention has been made in consideration of the above prior art, and has as its object to provide a perpendicular magnetic recording medium which suppresses the occurrence of pinning failure caused by an external magnetic field, and which reduces medium noise.

It is another object of the present invention to provide a perpendicular magnetic recording/reproducing apparatus capable of high-quality magnetic recording and reproduction by using a perpendicular magnetic recording medium which suppresses the occurrence of pinning failure and reduces medium noise.

According to the present invention, there is provided a perpendicular magnetic recording medium in which a longitudinal hard magnetic layer, longitudinal soft magnetic layer, and perpendicular magnetic recording layer are multilayered in this order on a substrate, wherein the longitudinal hard magnetic layer and the longitudinal soft magnetic layer couple with each other by exchange coupling more weakly than when the longitudinal soft magnetic layer is directly formed on the uniform longitudinal hard magnetic layer.

The perpendicular magnetic recording medium of the present invention is roughly classified into the following six aspects.

A perpendicular magnetic recording medium according to a first aspect of the present invention comprises a substrate, a longitudinal hard magnetic layer formed on the substrate, a magnetic layer formed on the longitudinal hard magnetic layer and having saturation magnetization smaller than that of the longitudinal hard magnetic layer, a longitudinal soft magnetic layer formed on the magnetic layer, and a perpendicular magnetic recording layer.

A perpendicular magnetic recording medium according to a second aspect of the present invention comprises a substrate, a longitudinal hard magnetic layer formed on the substrate, a nonmagnetic layer formed on the longitudinal hard magnetic layer and having a thickness of less than 0.5 nm, a longitudinal soft magnetic layer formed on the nonmagnetic layer, and a perpendicular magnetic recording layer formed on the longitudinal soft magnetic layer.

A perpendicular magnetic recording medium according to a third aspect of the present invention comprises a substrate, a longitudinal hard magnetic layer formed on the substrate, a nonmagnetic layer formed on the longitudinal hard magnetic layer and mainly containing cobalt, a longitudinal soft magnetic layer formed on the nonmagnetic layer, and a perpendicular magnetic recording layer formed on the longitudinal soft magnetic layer.

A perpendicular magnetic recording medium according to a fourth aspect of the present invention comprises a substrate, a longitudinal hard magnetic layer formed on the substrate, a nonmagnetic layer formed on the longitudinal hard magnetic layer and mainly containing ruthenium, a longitudinal soft magnetic layer formed on the nonmagnetic layer, and a perpendicular magnetic recording layer formed on the longitudinal soft magnetic layer.

A perpendicular magnetic recording medium according to a fifth aspect of the present invention comprises a substrate, a longitudinal hard magnetic layer formed on the substrate, an oxide layer formed on the longitudinal hard magnetic layer from the longitudinal hard magnetic layer, a longitudinal soft magnetic layer formed on the oxide layer, and a perpendicular magnetic recording layer formed on the longitudinal soft magnetic layer.

A magnetic recording/reproducing apparatus according to a sixth aspect of the present invention comprises a perpendicular magnetic recording medium according to any one of the first to fifth aspects described above, drive mechanism for supporting and rotating the perpendicular magnetic recording medium, a magnetic head having an element which records information on the perpendicular magnetic recording medium, and an element which reproduces recorded information, and a carriage assembly which supports the magnetic head such that the magnetic head freely moves with respect to the perpendicular magnetic recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

DETAILED DESCRIPTION OF THE INVENTION

The present inventors made extensive studies to suppress the occurrence of pinning failure caused by an external magnetic field and reduce medium noise, in a perpendicular magnetic recording medium in which a longitudinal hard magnetic layer, longitudinal soft magnetic layer, and perpendicular magnetic recording layer are multilayered.

Consequently, to suppress the occurrence of pinning failure caused by an external magnetic field without increasing medium noise, the present inventors have noted a medium in which a longitudinal hard magnetic layer and longitudinal soft magnetic layer weakly couple with each other by exchange coupling, then when a longitudinal soft magnetic layer is directly formed on a uniform longitudinal hard magnetic layer.

For this purpose, in the magnetic characteristics of a composite layer of the longitudinal hard magnetic layer and longitudinal soft magnetic layer, the effective coercive force of the longitudinal hard magnetic layer is preferably larger than that when the longitudinal soft magnetic layer is directly formed on this longitudinal hard magnetic layer. This appropriately weakens the exchange coupling between the hard and soft magnetic layers and further suppresses the occurrence of pinning failure.

Furthermore, the effective coercive force of the longitudinal hard magnetic layer in this composite layer is desirably smaller than that of the longitudinal hard magnetic layer alone. This more strongly fixes the magnetization direction in the soft magnetic layer and further suppresses the occurrence of pinning failure.

Note that in the present invention, the exchange coupling between the hard and soft magnetic layers means an action in which magnetization in the hard magnetic layer and magnetization in the soft magnetic layer couple with each other by exchange coupling.

According to the first aspect of the present invention, there is provided a magnetic recording medium having a substrate, a longitudinal hard magnetic layer formed on the substrate, a longitudinal soft magnetic layer formed on the longitudinal hard magnetic layer, and a magnetic recording layer formed on the longitudinal soft magnetic layer, wherein a magnetic layer having saturation magnetization smaller than that of the longitudinal hard magnetic layer is formed between the longitudinal hard magnetic layer and the longitudinal soft magnetic layer.

In this invention according to the first aspect, the magnetic layer having saturation magnetization smaller than that of the longitudinal hard magnetic layer is formed. Therefore, the exchange coupling between the hard and soft magnetic layers can be appropriately adjusted without being excessively weakened, and pinning failure by an external magnetic field can be suppressed without increasing the medium noise. Also, since the thickness of the hard magnetic layer can be decreased accordingly, medium noise can be reduced.

According to the second to fourth aspects of the present invention, there is provided a magnetic recording medium having a substrate, a longitudinal hard magnetic layer formed on the substrate, a longitudinal soft magnetic layer formed on the longitudinal hard magnetic layer, and a magnetic recording layer formed on the longitudinal soft magnetic layer, wherein a predetermined nonmagnetic layer is formed between the longitudinal hard magnetic layer and the longitudinal soft magnetic layer.

In the invention according to the second aspect, the nonmagnetic layer mainly contains cobalt.

In the invention according to the third aspect, the nonmagnetic layer mainly contains ruthenium.

In the invention according to the fourth aspect, the nonmagnetic layer has a thickness of less than 0.5 nm.

In the inventions according to the second to fourth aspects, the formation of the predetermined nonmagnetic layer makes it possible to appropriately weaken the exchange coupling between the hard and soft magnetic layers, and suppress pinning failure that may be caused by an external magnetic field without increasing the medium noise.

According to the fifth aspect of the present invention, there is provided a magnetic recording medium having a substrate, a longitudinal hard magnetic layer formed on the substrate, a longitudinal soft magnetic layer formed on the longitudinal hard magnetic layer, and a magnetic recording layer formed on the longitudinal soft magnetic layer, wherein an oxide layer of the longitudinal hard magnetic layer is formed between the longitudinal hard magnetic layer and the longitudinal soft magnetic layer.

In this invention according to the fifth embodiment, the formation of the oxide layer makes it possible to appropriately weaken the exchange coupling between the hard and soft magnetic layers, and suppress pinning failure that may be caused by an external magnetic field without increasing the medium noise.

Figure 1:
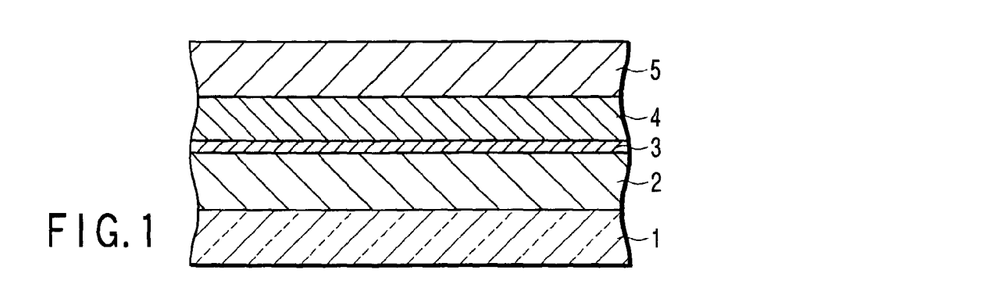
FIG. 1 is a view showing an example of the structure of a magnetic recording medium of the present invention.

FIG. 1 is a view showing an example of the structure of a magnetic recording medium of the present invention.

As shown in FIG. 1, this magnetic recording medium of the present invention has a structure in which a longitudinal hard magnetic layer 2, interlayer 3, longitudinal soft magnetic layer 4, and magnetic recording layer 5 are formed in this order on a substrate 1. As the interlayer 3, a magnetic layer having saturation magnetization smaller than that in the longitudinal hard magnetic layer 4, a nonmagnetic layer, or an oxide layer of the longitudinal hard magnetic layer 4 is formed.

The nonmagnetic layer preferably contains, as its main component, at least one of cobalt, ruthenium, vanadium, chromium, copper, and molybdenum.

If the main component is cobalt, the thickness of this nonmagnetic layer is preferably 1 to 5 nm. Cobalt can also be combined with ruthenium or chromium.

If the main component is ruthenium, the thickness of this nonmagnetic layer can be 0.5 to 0.9 nm.

If the main components are vanadium, chromium, copper, and molybdenum, the thickness of the nonmagnetic layer is less than 0.5 nm. When the manufacturing process of the medium is taken into consideration, if the thickness of each layer is too small, it becomes difficult to control the layer thicknesses and maintain the uniformity on the entire disk surface. Therefore, the nonmagnetic layer preferably has a certain thickness, e.g., 0.3 nm or more. Accordingly, a preferred thickness of this nonmagnetic layer is not less than 0.3 nm and less than 0.5 nm.

One possible method of increasing the thickness of the interlayer while maintaining an appropriate magnitude of exchange coupling is to give magnetization to a certain degree to this interlayer. The magnitude of saturation magnetization in this case is preferably smaller than that in the hard magnetic layer, since the interlayer is inserted in order to weaken the coupling.

Saturation magnetization in the magnetic layer is preferably ¼ that in the longitudinal hard magnetic layer or less.

It is preferable to add 3d magnetic metals such as Fe, Co, and Ni to the magnetic layer formed between the hard and soft magnetic layers and having saturation magnetization smaller than that in the hard magnetic layer, from the viewpoints of the ease of mixing with other metals and the crystal structure. For example, when CoCrPt is used in the hard magnetic layer and CoZrNb is used in the soft magnetic layer, Co is contained in both the layers, so the interlayer is easily mixed if Co is added to this layer. When the crystal structure is taken into consideration, RuCo or CoCr having the same hexagonal closest packed structure as the hard magnetic layer is desirable. Since CoZrNb is amorphous, the crystallinity of the soft magnetic layer is not taken into account. If this soft magnetic layer is crystalline, it is presumably effective to use, where necessary, Fe having a body-centered cubic structure or Ni having a face-centered cubic structure, when epitaxial growth is taken into account.

The thickness of the longitudinal hard magnetic layer is preferably 50 nm or less, more preferably, 5 nm to 50 nm, and most preferably, 10 to 40 nm. When the thickness of this longitudinal hard magnetic layer is 50 nm or less, the medium noise can be further reduced. If this thickness is less than 5 nm, it tends to be in many cases impossible to obtain satisfactory magnetic characteristics and a satisfactory magnetizing effect. If the thickness exceeds 50 nm, a satisfactory magnetizing effect tends to be obtained even when the soft magnetic layer is directly formed on the hard magnetic layer without using any nonmagnetic layer, and the medium noise also can increase.

The thickness of the longitudinal soft magnetic layer is preferably 20 nm or more, more preferably, 20 to 500 nm, and most preferably, 50 to 400 nm. If the thickness of this longitudinal soft magnetic layer exceeds 500 nm, dust is tends to be easily generated during sputtering, and this increases the surface roughness of the magnetic recording medium, making it difficult to decrease the floating amount of the head. As a consequence, pinning failure can be further suppressed. If the thickness is less than 20 nm, the coercive force of a portion corresponding to the soft magnetic layer tends to increase, so a satisfactory soft magnetic characteristics cannot be obtained.

As the longitudinal hard magnetic layer, it is possible to use, e.g., alloys containing Co, Cr, and Pt as main components, and rare earth magnetic alloys such as SmCo.

This longitudinal hard magnetic layer can also contain at least one element selected from the group consisting of palladium, ruthenium, and rhodium.

As the longitudinal soft magnetic layer, it is possible to use a soft magnetic material having high permeability, e.g., CoZrNb, FeTaC, FeZrN, FeSi alloy, FeAl alloy, an FeNi alloy such as permalloy, FeCo-based alloy such as Permendur, FeCoNi alloy such as Perminvar, NiCo alloy, sendust, MnZn-based ferrite, NiZn-based ferrite, MgZn-based ferrite, MgMn-based ferrite, FeAlGa, FeCuNbSiB, FeGaGe, FeGeSi, FeNiPb, FeRuGaSi, FeSiB, FeSiC, FeZrB, FeZrBCu, CoFeSiB, CoTi, and CoZrTa.

As the perpendicular magnetic recording layer, alloys consisting primarily of Co, Cr, and Pt similar to the longitudinal magnetic recording medium can be used. In addition, it is possible to use CoCr-based alloy, CoPt-based alloy, CoPtO, CoPtCrO, CoPtB, and CoPtCrB. Furthermore, it is possible to use a multilayered structure of Co and an alloy consisting primarily of at least one element selected from the group consisting of Pt, Pd, Rh, and Ru, and to use CoCr/PtCr, CoB/PdB, and CoO/RhO formed by adding Cr, B, and O to these multilayered structures.

In the present invention, a nonmagnetic underlayer can also be formed between the soft magnetic layer and the perpendicular magnetic recording layer. Since the surface crystallinity of the soft magnetic layer changes in accordance with the material, the formation of the nonmagnetic underlayer is preferable to control the crystal alignment such that the direction of the easy axis in the perpendicular magnetic recording layer is the vertical direction. When this nonmagnetic underlayer is formed, it is necessary to improve the crystal grain size and recording resolution, and reduce the noise.

When a material containing at least one element selected from Co, Cr, and Pt is used as the magnetic recording layer, the nonmagnetic underlayer is desirably made of a material having a composition which uses the same Co, Cr, and Pt as the magnetic recording layer and which is nonmagnetic, from the viewpoint of lattice mismatch. When Pt alone is used as the nonmagnetic underlayer, good magnetic characteristics and recording/reproduction characteristics can be obtained even if Pd, Rh, or Ru is used. Accordingly, the magnetic characteristics and recording/reproduction characteristics can be expected to further improve by using, between the soft magnetic layer and the perpendicular magnetic recording layer, an alloy consisting primarily of at least one element selected from the group consisting of Co, Cr, Pt, Pd, Rh, and Ru.

Furthermore, before the nonmagnetic underlayer is formed it is possible to use, as a seed layer, B, C, Al, Si, P, Ti, Zr, Hf, Cr, V, Nb, Ta, Ru, Rd, Pd, Pt, Cu, Ag, and Au; NiAl and NiTa as combinations of these metals and Fe, Co, and Ni as magnetic metals; and oxides and nitrides of these compounds.

As the nonmagnetic substrate, it is possible to use a glass substrate, an Al-based alloy substrate, an Si single-crystal substrate having an oxidized surface, or a substrate formed by plating the surface of any of these substrates with NiP or the like.

Also, although only sputtering is taken as an example of the formation method of each layer, the same effect can be obtained by vacuum vapor deposition or the like.

According to the sixth aspect of the present invention, there is provided a magnetic recording/reproducing apparatus comprising a perpendicular magnetic recording medium according to any one of the first to fifth aspects described above, a driving mechanism which supports and rotates the perpendicular magnetic recording medium, a magnetic head having an element which records information on the perpendicular magnetic recording medium, and an element which reproduces recorded information, and a carriage assembly which supports the magnetic head such that the magnetic head freely moves with respect to the perpendicular magnetic recording medium.

Figure 2:
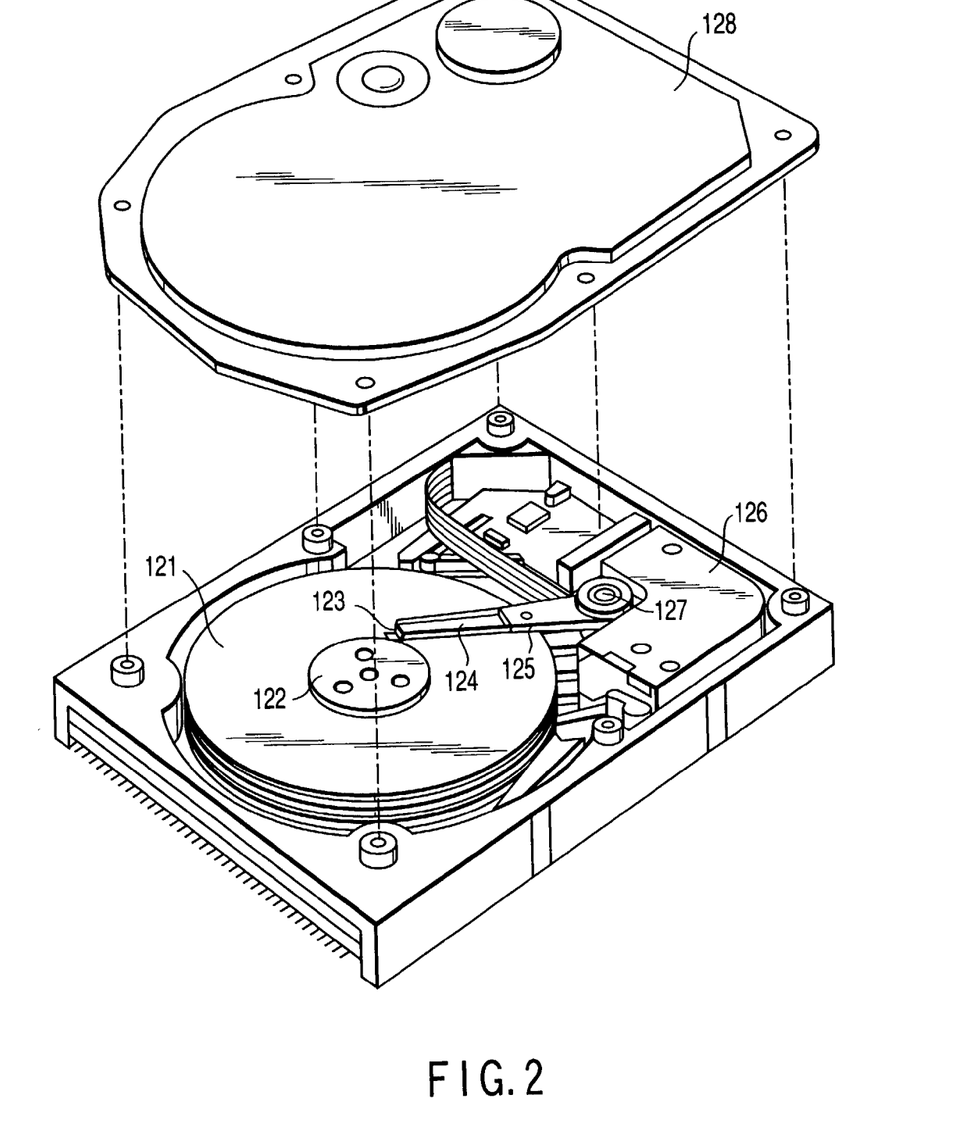
FIG. 2 is a partially exploded perspective view showing an example of the arrangement of a magnetic recording/reproducing apparatus of the present invention.

FIG. 2 is a partially exploded perspective view showing an example of the arrangement of a magnetic recording/reproducing apparatus of the present invention.

As shown in FIG. 2, a rigid magnetic disk 121 for recording information according to the present invention is fitted on a spindle 122 and rotated at a predetermined rotating speed by a spindle motor (not shown). A slider 123 mounting a single-pole recording head and MR head for recording and reproducing, respectively, information by accessing the magnetic disk 121 is attached to the end portion of a suspension 124 which is a thin leaf spring. This suspension 124 is connected to one end of an arm 125 having a bobbin for holding a driving coil (not shown).

A voice coil motor 126 as a kind of linear motor is positioned at the other end of the arm 125. This voice coil motor 126 is composed of the driving coil (not shown) wound in the bobbin of the arm 125, and a magnetic circuit having a permanent magnet and counter yoke facing each other with the driving coil sandwiched between them.

The arm 125 is held by ball bearings (not shown) formed in upper and lower portions of a fixed shaft 127, and pivoted by the voice coil motor 126. That is, the position of the slider 123 on the magnetic disk 121 is controlled by the voice coil motor 126. Reference numeral 128 in FIG. 2 denotes a lid.

The present invention will be described in more detail below by way of examples.

EXAMPLE 1

As a nonmagnetic substrate 1, a glass substrate meeting the standard specification of a 2.5-inch magnetic disk was prepared.

This nonmagnetic substrate was heated to 200° C., and the following layers were formed on the substrate by DC magnetron sputtering in an Ar atmosphere at a gas pressure of 0.6 Pa.

First, a 40-nm thick CrMo alloy was formed as a nonmagnetic underlayer on the nonmagnetic substrate. On this nonmagnetic underlayer, a 50-nm thick Co-20at. % Cr-13at. % Pt hard magnetic layer was multilayered to form a longitudinal hard magnetic layer.

After that, a 0.7-nm thick Ru layer was formed as a nonmagnetic interlayer on the longitudinal hard magnetic layer.

Furthermore, on this Ru layer, a 120-nm thick Co-5at. % Zr-10at. % Nb alloy was formed as a longitudinal soft magnetic layer.

On this longitudinal soft magnetic layer, a 20-nm thick nonmagnetic Co-37at. % Cr-8at. % Pt alloy was formed as a nonmagnetic underlayer, and a 30-nm thick Co-20at. % Cr-10at. % Pt-2at. % B alloy was formed as a perpendicular magnetic recording layer. On top of the resultant structure, a 7-nm thick C layer was formed as a protective layer, thereby obtaining a perpendicular magnetic recording medium.

Figure 3:
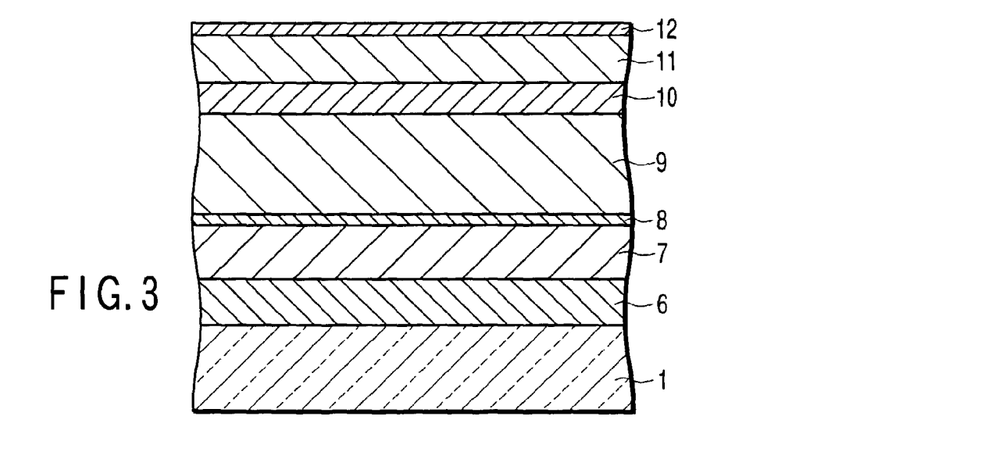
FIG. 3 is a view showing another example of the structure of the magnetic recording medium of the present invention.

FIG. 3 is a sectional view showing the structure of the obtained perpendicular magnetic recording medium.

As shown in FIG. 3, this perpendicular magnetic recording medium has a structure in which a nonmagnetic underlayer 6, longitudinal hard magnetic layer 7, nonmagnetic interlayer 8, longitudinal soft magnetic layer 9, nonmagnetic underlayer 10, perpendicular magnetic recording layer 11, and protective layer 12 are multilayered in this order on the nonmagnetic substrate 1.

The perpendicular magnetic recording medium thus obtained by continuously forming films in a vacuum chamber was extracted to the atmosphere and applied with a magnetic field of 15 kOe from the inside to the outside in the direction of radius of the disk-like substrate by using a dedicated magnetizing apparatus an electromagnet, thereby magnetizing the longitudinal hard magnetic layer in the radius direction. All perpendicular magnetic recording media to be described below were subjected to this magnetizing operation unless otherwise specified.

The recording/reproduction characteristics of the perpendicular magnetic medium thus manufactured were evaluated by using a spin stand. As a recording/reproducing head, a single-pole head using the magnetoresistance effect as a reproducing element was used. A reproduced signal output S was measured at a linear recording density of 50 kFCI. The ratio (S/Nm) of the reproduced signal output to the medium noise was measured at a linear recording density of 400 kFCI.

As a result, no spike noise was observed over the entire disk surface, and the S/Nm was as high as 22 dB.

Note that the recording/reproduction characteristics were measured in the same manner as above after the film formation and before the magnetization was performed as described above. Consequently, a plurality of spike noise components having substantially the same magnitude as the reproduced signal were observed. This indicates that the longitudinal hard magnetic layer was in effect evenly magnetized in the radius direction of the substrate by the magnetizing operation, thereby suppressing the formation of magnetic walls.

This perpendicular magnetic recording medium was incorporated into a magnetic recording/reproducing apparatus (HDD), recording and reproduction were performed, and then the medium was removed from the HDD. This medium was again used to evaluate the recording/reproduction characteristics after the recording and reproducing operations by using the spin stand.

As a consequence, in the medium of Example 1, no spike noise was observed like before the recording and reproducing operations were performed, and no deterioration of any other recording/reproduction characteristics was observed. This demonstrates that in Example 1, no pinning failure was presumably generated by a leakage flux from the VCM in the HDD.

COMPARATIVE EXAMPLE 1

A perpendicular magnetic recording medium was obtained following the same procedures as in Example 1, except that no nonmagnetic interlayer was formed between a longitudinal hard magnetic layer and a longitudinal soft magnetic layer. The recording/reproduction characteristics of the obtained perpendicular magnetic recording medium before magnetization and before and after recording and reproduction were evaluated in the same manner as in Example 1.

As a result, before recording and reproduction were performed, no spike noise was observed over the entire disk surface, and the S/Nm was as high as 22 dB.

Before magnetization in the HDD, a plurality of spike noise components having substantially the same magnitude as the reproduced signal were observed. This indicates that the longitudinal hard magnetic layer was in effect evenly magnetized in the radius direction of the substrate by the magnetizing operation, thereby suppressing the formation of magnetic walls.

In the magnetic recording medium after recording and reproduction were performed, a plurality of spike noise components having substantially the same magnitude as the reproduced signal were observed on the edge of the disk. This demonstrates that in Comparative Example 1, pinning failure presumably occurred on the edge of the disk by a leakage flux from the VCM in the HDD.

As described above, spike noise on the edge of the disk was observed in Comparative Example 1 and was not observed in Example 1. This shows that the formation of the Ru nonmagnetic interlayer between the longitudinal hard magnetic layer and the longitudinal soft magnetic layer has the effect of suppressing the spike noise, e.g., preventing the pinning failure of the perpendicular magnetic recording medium.

EXPERIMENT EXAMPLE 1

To examine the presence/absence of the generation of spike noise in detail, media of Experiment Example 1 and Comparative Experiment Example 1 were manufactured by noting the magnetized state of the composite layer of the hard and soft magnetic layers.

As Experiment Example 1, a sample was manufactured following the same procedures as in Example 1, except that a C protective layer was directly formed on a CoZrNb longitudinal soft magnetic layer without forming a CoCrPt nonmagnetic underlayer and CoCrPtB perpendicular magnetic recording layer.

In addition, as Comparative Experiment Example 1, a sample was manufactured following the same procedures as in Comparative Example 1, except that a C protective layer was directly formed on a CoZrNb longitudinal soft magnetic layer without forming a CoCrPt nonmagnetic underlayer and CoCrPtB perpendicular magnetic recording layer.

These samples of Comparative Experiment Example 1 and Experiment Example 1 were incorporated into HDDs, and the HDDs were continuously operated for a week at 75° C. in a constant-temperature bath. After that, the magnetic recording media were removed, and the magnetization directions on the surfaces of the soft magnetic layers were observed using an optical surface analyzer (OSA). The OSA observation results of Comparative Experiment Example 1 and Experiment Example 1 are shown in FIGS. 4 and 5, respectively.

Figure 4:
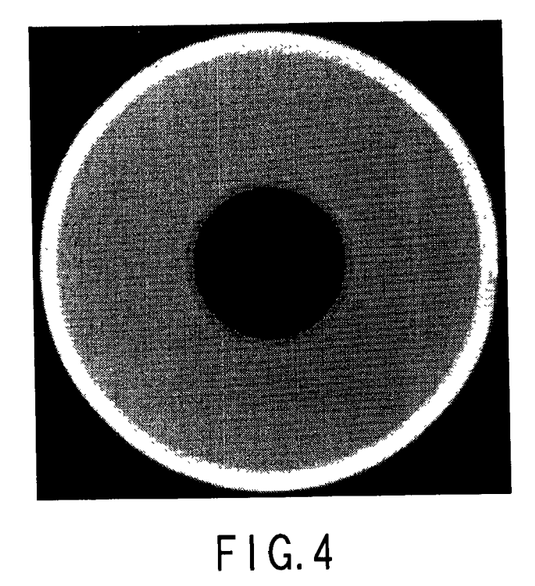
FIG. 4 is a data image representing the result of OSA observation of a sample according to prior art.
Figure 5:
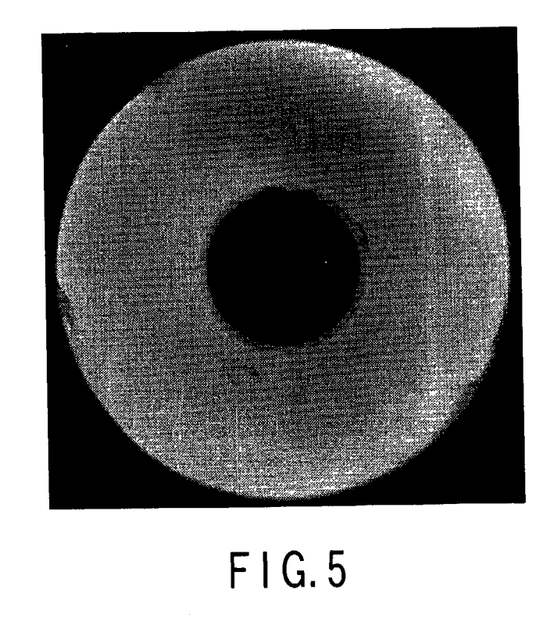
FIG. 5 is a data image representing the result of OSA observation of a sample according to the present invention.

Although the edge of the sample is whitened in FIG. 4, the color of the entire sample surface is uniform in FIG. 5. In the OSA evaluation result, the direction of magnetization is difficult to specify. However, the color looks different if magnetic domains having different magnetization directions are in contact. Therefore, when magnetization performed in the radius direction and the presence/absence of the generation of spike noise are taken into consideration, the state probably remained unchanged from the initial magnetized state in FIG. 5, but magnetization in the whitened portion in FIG. 4 presumably changed from the radius direction.

From the foregoing, when the samples of Experiment Example 1 and Comparative Experiment Example 1 were incorporated into the HDDs similar to a magnetic recording medium, pinning failure (by the VCM) occurred on the edge in Comparative Experiment Example 1 in which the longitudinal soft magnetic layer was directly formed on the longitudinal hard magnetic layer. In contrast, the occurrence of this pinning failure was suppressed in Experiment Example 1 in which the nonmagnetic interlayer was formed. Accordingly, the formation of the nonmagnetic intermediate layer between the longitudinal hard and soft magnetic layers has the effect of preventing the pinning failure in the perpendicular magnetic recording medium.

To examine this pinning failure in more detail, a vibration sample magnetometer (VSM) was used to evaluate the magnetic characteristics. From each of the perpendicular magnetic recording media of Experiment Example 1 and Comparative Experiment Example 1, a portion near the center of the sample was cut out into a square piece of 1 cm², and a magnetic field was applied in the longitudinal direction of the film by the VSM. The obtained magnetization curves are shown in FIG. 6.

Figure 6:
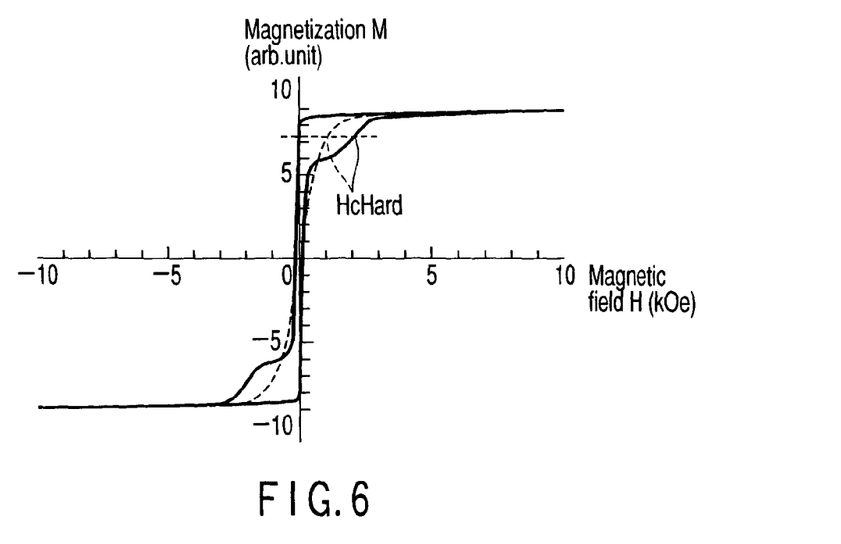
FIG. 6 is a graph showing magnetization curves of the samples shown in FIGS. 4 and 5.

Referring to FIG. 6, the dotted line indicates Comparative Experiment Example 1, and the solid lines indicate Experiment Example 1, although these two types of lines partially overlap.

As shown in FIG. 6, in Experiment Example 1, the nonmagnetic interlayer was formed between the hard and soft magnetic layers, so the exchange interaction between these magnetic layers weakened. Accordingly, after most of the soft magnetic layer underwent magnetic reversal, the hard magnetic layer underwent magnetic reversal. By contrast, in Comparative Experiment Example 1, the soft magnetic layer was directly formed on the hard magnetic layer, so the exchange coupling interaction between these layers was strong. Consequently, the two layers gradually underwent magnetic reversal together.

FIGS. 7 to 10 are schematic views for explaining the magnetized states in this case. In each of FIGS. 7 to 10, the lower layer is the hard magnetic layer 2, and the upper layer is the soft magnetic layer 4. The magnetization direction before an external magnetic field H indicated by a thick arrow is applied is opposite to the direction of H as indicated by dotted arrows. An arrow r indicates the radius direction of the medium.

Figure 7:
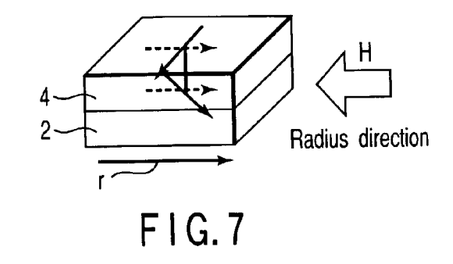
FIG. 7 is a schematic view for explaining the magnetized state of prior art.
Figure 8:
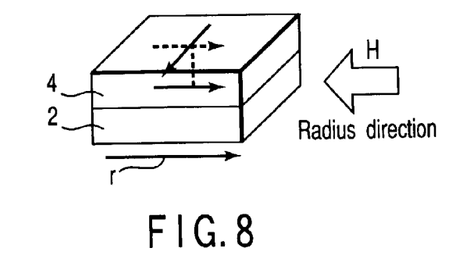
FIG. 8 is a schematic view for explaining the magnetized state of the magnetic recording medium of the present invention.
Figure 9:
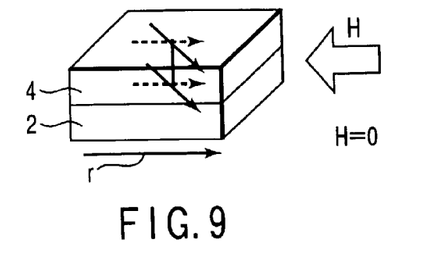
FIG. 9 is a schematic view for explaining the magnetized state of the prior art.
Figure 10:
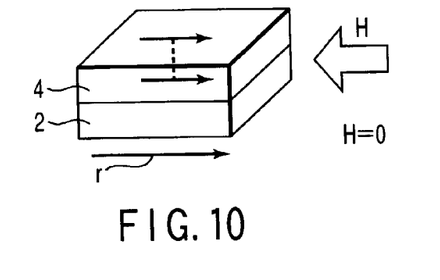
FIG. 10 is a schematic view for explaining the magnetized state of the magnetic recording medium of the present invention.

FIGS. 7 and 8 illustrate the magnetized states of the soft and hard magnetic layers when the external magnetic field H opposite to the magnetization direction is applied to the magnetic recording media of Comparative Experiment Example 1 and Experiment Example 1, respectively. FIGS. 9 and 10 illustrate the magnetized states of Comparative Experiment Example 1 and Experiment Example 1, respectively, after this external magnetic field is removed (H=0). Assume that an external magnetic field by which magnetization in the soft magnetic layer rotates 90° is applied first, since the soft magnetic layer is readily influenced by an external magnetic field. In FIG. 7, the double line between the arrows represents a strong exchange coupling interaction. In FIG. 8, the dotted line between the arrows represents a weak exchange coupling interaction.

In Comparative Experiment Example 1, the exchange coupling interaction between the two magnetic layers is strong, so magnetization in the hard magnetic layer is influenced and changes from the original direction indicated by the dotted arrow as shown in FIG. 7. Even when the external magnetic field is enhanced after that, the soft magnetic layer basically undergoes magnetic reversal first, and subsequently the hard magnetic layer undergoes magnetic reversal first, earlier than when the soft magnetic layer is absence, owing to the strong exchange coupling interaction. When the magnetization reversing mechanism is like this, the state shown in FIG. 7 changes to the state shown in FIG. 9 when the magnetic field is removed. That is, the magnetization direction does not return to the original direction indicated by the dotted arrow. As a consequence, pinning failure occurs.

In Experiment Example 1, the exchange coupling interaction between the two magnetic layers is weakened as indicated by the dotted line between the arrows. Therefore, magnetization in the hard magnetic layer is not influenced by magnetization rotation in the soft magnetic layer and remains in the original direction. However, if the external magnetic field is further enhanced after that, magnetization in the hard magnetic layer is eventually influenced by that in the soft magnetic layer, because there is magnetic coupling to some extent between them, and the hard magnetic layer undergoes magnetic reversal first with a weaker magnetic field than when the layer is alone. When the magnetization reversing mechanism is like this, the magnetization direction returns to the original magnetization direction as shown in FIG. 10 if the magnetic field is removed from the state shown in FIG. 8. Accordingly, no pinning failure occurs.

The difference between the magnetization curves of Comparative Experiment Example 1 and Experiment Example 1 shown in FIG. 6 is presumably produced by the magnetization reversing mechanisms as described above. That is, in general, when the exchange coupling between the hard and soft magnetic layers is strong, the magnetization curve as in Comparative Experiment Example 1 is obtained; when this exchange coupling is weak, the magnetization curve as in Experiment Example 1 is obtained. Furthermore, from the same consideration as explained in FIGS. 7 to 10, pinning failure probably occurs easily when the exchange coupling between the hard and soft magnetic layers is strong and hardly occurs when this exchange coupling is weak.

Accordingly, pinning failure was prevented by forming the nonmagnetic layer between the hard and soft magnetic layers in Example 1 and Experiment Example 1. Essentially, however, pinning failure readily takes place when the exchange coupling between the two magnetic layers is strong as in Comparative Example 1 and Comparative Experiment Example 1, so the pinning failure was prevented by weakening this exchange coupling. This demonstrates that weakening the exchange coupling between the hard and soft magnetic layers has the effect of preventing pinning failure in the perpendicular magnetic recording medium.

The largest difference between the magnetization curves of Comparative Experiment Example 1 and Experiment Example 1 shown in FIG. 6 is a portion indicated by $Hc^{Hard}$ in the upper portion of the drawing. The dotted line approximately indicates a position where saturation magnetization in the hard magnetic layer alone is subtracted from saturation magnetization in the whole composite layer of the hard and soft magnetic layers. The intersections of this dotted line and the individual magnetization curves presumably correspond to a coercive force Hc of substantially the hard magnetic layer. For the sake of convenience, therefore, this value will be called $Hc^{Hard}$ hereinafter and used as a measure of the exchange coupling strength between the hard and soft magnetic layers.

When the nonmagnetic layer is formed between the two ferromagnetic layers as in Experiment Example 1, the strength (absolute value) of the exchange interaction lowers as the nonmagnetic layer thickness increases. When this nonmagnetic layer thickness is 0 and the interaction is a maximum as in Comparative Experiment Example 1, $Hc^{Hard}$ is a minimum; when the nonmagnetic layer thickness is sufficiently large and there is no interaction, $Hc^{Hard}$ is equal to the value of Hc of the hard magnetic layer alone. To obtain exchange coupling of desired strength, therefore, it is important to examine a change in $Hc^{Hard}$ with the nonmagnetic layer thickness.

EXPERIMENT EXAMPLE 2

As Experiment Example 2, a few samples were manufactured following the same procedures as in Experiment Example 1, except that the thickness of an Ru layer as a nonmagnetic interlayer was changed within the range of 0 to 2 nm.

$Hc^{Hard}$ of each sample was evaluated by the VSM, thereby checking the dependence on the nonmagnetic layer thickness. The result is shown in FIG. 12.

Figure 12:
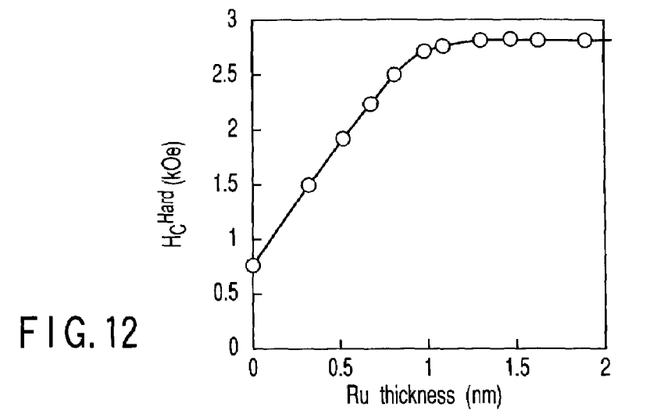
FIG. 12 is a graph showing the relationship between the nonmagnetic layer thickness and $Hc^{Hard}$.

FIG. 12 shows that the value of $Hc^{Hard}$ monotonically increased from Ru layer thickness=0 nm and saturated when the thickness exceeded 1 nm. Generally, in a thin film in which a ferromagnetic transition metal and nonmagnetic metal are multilayered, ferromagnetic coupling and antiferromagnetic coupling periodically appear with respect to the thickness of the nonmagnetic layer. Therefore, this $Hc^{Hard}$ value was also expected to periodically oscillate. However, no antiferromagnetic coupling state was observed even from the shape of the magnetization curve, so all the media manufactured in Experiment Example 2 were presumably ferromagnetically coupled. For example, when Ru is used as a nonmagnetic interlayer between ferromagnetic layers, antiferro-magnetic coupling is generally obtained with a layer thickness of about 0.8 mm. However, the sample having a layer thickness of about 0.8 mm according to this experimental example had no particular difference from the samples probably ferromagnetically coupled and having other layer thicknesses.

Referring to FIG. 12, the saturated value of $Hc^{Hard}$ was about 2.8 kOe, substantially equal to Hc of the hard magnetic layer alone. Hence, this region is presumably subjected to almost no influence from the soft magnetic layer to the hard magnetic layer. When the thickness of the Ru layer is 1 nm or more, the soft and hard magnetic layers do not substantially couple by exchange coupling. Therefore, to uniformly fix magnetization in the soft magnetic layer in the radius direction by magnetization in this sample, the Ru layer thickness is preferably 1 nm or less.

On the other hand, the effect of suppressing pinning failure is probably obtained regardless of the thickness of the nonmagnetic layer as long as the layer exists. Accordingly, the minimum value of the nonmagnetic layer thickness is perhaps favorably about 0.2 nm which is equivalent to one atomic layer. Essentially, however, the smaller the strength of the exchange coupling, the larger the pinning failure suppressing effect. Therefore, judging from the value of $Hc^{Hard}$ in the graph of FIG. 12, the Ru layer thickness is perhaps more favorably about 0.5 to 0.9 nm.

When the magnetization curves in FIG. 6 and the magnetization reversing mechanisms as shown in FIGS. 7 to 10 are taken into consideration, pinning failure by the VCM in the HDD does not occur when the leakage magnetic field of the VCM is in the same direction as the magnetization direction of the medium, e.g., from the inside to the outside along the radius direction. This pinning failure readily occurs if the leakage magnetic field is in the opposite direction, e.g., from the outside to the inside along the radius direction.

Of the samples manufactured in Experiment Example 2, the magnetic field $H^R$ and magnetization recovery ratio of each of samples having Ru layer thicknesses of 0.5 and 0.8 nm and a sample having no Ru layer were measured.

Figure 11:
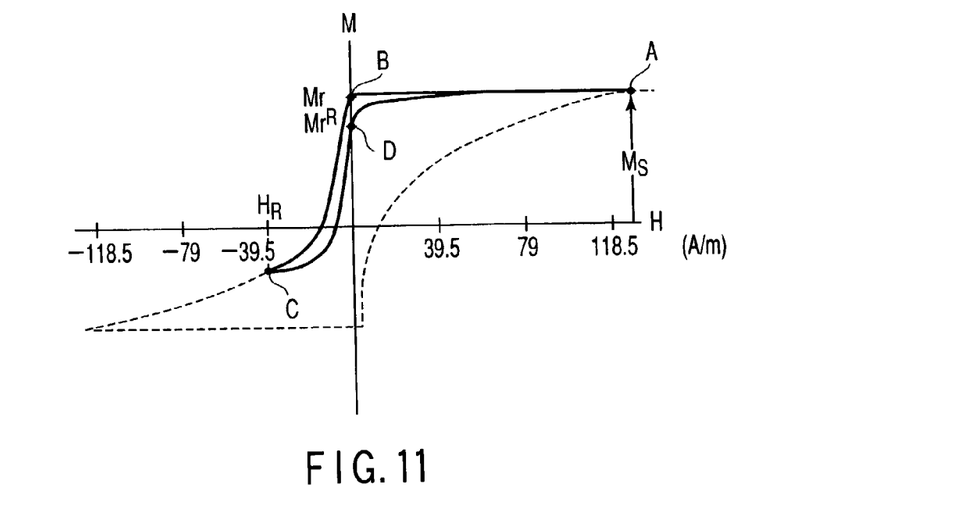
FIG. 11 is a graph for explaining the definitions of a magnetic field $H^R$ and a magnetization recovery ratio.

FIG. 11 is a graph showing examples of magnetization curves for explaining the definitions of the magnetic field $H^R$ and magnetization recovery ratio.

As indicated by a point A in FIG. 11, the samples were once magnetized to saturation by using the VSM. After that, similar to the opposite leakage magnetic field by the VCM, a magnetic field opposite to the residual magnetization direction was applied to check the ease with which pinning failure occurred.

First, on the magnetization curves pertaining to these samples, the state of residual magnetization Mr on the major loop was obtained as indicated by a point B. After that, the (negative) magnetic field $H^R$ in the direction opposite to the residual magnetization was applied as indicated by a point C, and the state was returned to 0 as indicated by a point D. In this state, a residual magnetization value $Mr^R$ was obtained.

The value obtained by dividing the residual magnetization value $Mr^R$ by Mr, i.e., $Mr^R$/Mr, is defined as the magnetization recovery ratio. A change in the magnetization recovery ratio with $H^R$ was checked. This magnetization recovery ratio is −1 in the state in which a magnetic field is applied in the negative direction until saturation is obtained and magnetization is not recovered at all, i.e., magnetization has completely undergone magnetic reversal.

Figure 13:
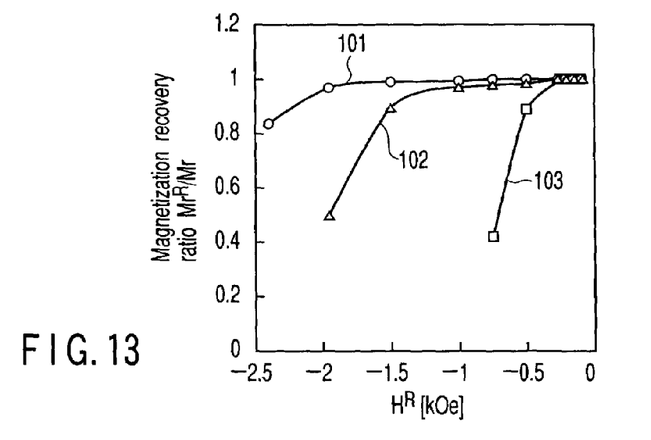
FIG. 13 is a graph showing the relationship between the magnetic field $H^R$ and the magnetization recovery ratio.

FIG. 13 is a graph showing the relationship between the (negative) magnetic field $H^R$ in the direction opposite to residual magnetization and the magnetization recovery ratio. Referring to FIG. 13, a curve 103 denotes the result when no Ru layer was formed, and curves 102 and 101 denote the results when the Ru layer thicknesses were 0.5 and 0.8 nm, respectively.

This graph in FIG. 13 shows that, in each sample, the residual magnetic field returned to substantially the same value until −0.2 kOe, even when the opposite magnetic field was applied, so no clear pinning failure probably occurred. However, if this opposite magnetic field HR was further increased, the smaller the Ru layer thickness of the medium, the faster the magnetization recovery ratio lowered, and the more easily the pinning failure occurred.

If the Ru layer thickness exceeds 1 nm as shown in FIG. 12, almost no exchange coupling acts between the hard and soft magnetic layers as can be seen from FIG. 5, so no sufficient magnetization is difficult to perform. This makes it difficult to stably point magnetization in the soft magnetic layer in one direction.

As described above, Experiment Example 2 reveals that the formation of the nonmagnetic interlayer having as large a thickness as possible with which sufficient magnetization can be performed has the effect of suppressing pinning failure in the perpendicular magnetic recording medium.

The Ru layer thickness with which sufficient magnetization can be performed is preferably about 0 to about 0.9 nm. To achieve the magnetization strength and magnetization recovery ratio at the same time, the Ru layer thickness is more preferably about 0.5 to about 0.9 nm.

From the above results, it is obvious that as the strength of the exchange interaction is reduced, it becomes more and more possible to suppress the pinning failure and increase the magnetization recovery ratio. With the decreasing magnitude of the exchange coupling interaction, $Hc^{Hard}$ increases. This indicates that the magnetization recovery ratio and $Hc^{Hard}$ are correlated. Therefore, to make pinning failure hard to occur by raising the magnetization recovery ratio, $Hc^{Hard}$ need only be increased.

For example, when a means for reducing the exchange coupling between the hard and soft magnetic layers is to form the nonmagnetic interlayer between these magnetic layers, it is possible, by checking the dependence of $Hc^{Hard}$ upon the nonmagnetic layer thickness, to roughly determine a preferred nonmagnetic layer thickness with which both the magnetizing effect and the pinning failure resistance are achieved.

EXPERIMENT EXAMPLE 3 & COMPARATIVE EXPERIMENT EXAMPLE 2

As Experiment Example 3, a few samples were manufactured following the same procedures as in Experiment Example 1, except that the thickness of a CoCrPt hard magnetic layer was changed to 50, 35, 20, and 15 nm.

Also, as Comparative Experiment Example 2, a few samples were manufactured following the same procedures as in Comparative Experiment Example 1, except that the thickness of a CoCrPt hard magnetic layer was changed to 50, 35, and 20 nm.

Figure 14:
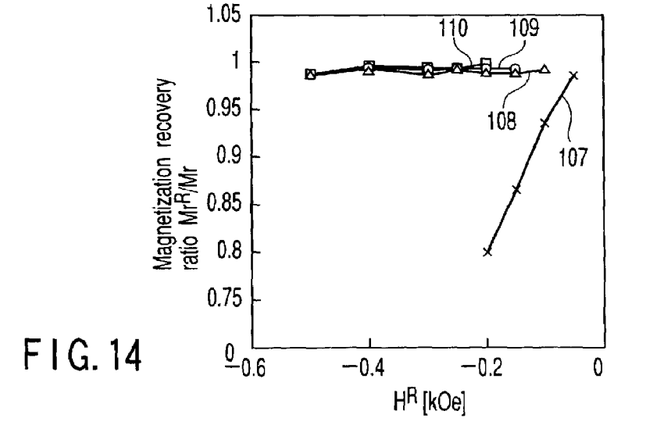
FIG. 14 is a graph showing the magnetization recovery ratio as a function of $H^R$ of the magnetic recording medium of the present invention.
Figure 15:
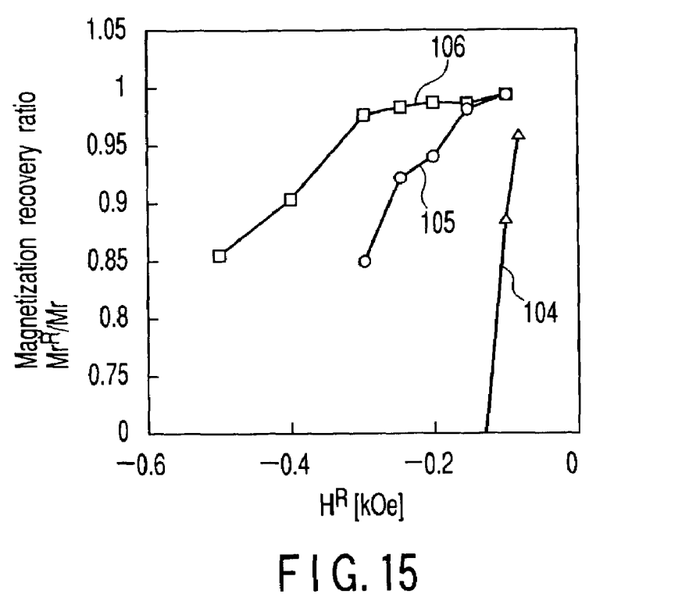
FIG. 15 is a graph showing the magnetization recovery ratio as a function of $H^R$ of the magnetic recording medium of the prior art.

For each sample of Experiment Example 3 and Comparative Experiment Example 2, a change in the magnetization recovery ratio with $H^R$ was measured using the VSM. The results are shown in FIGS. 14 and 15. Referring to FIG. 15, curves 104, 105, and 106 denote the results when the CoCrPt hard magnetic layer thickness was 20, 35, and 50 nm, respectively. Referring to FIG. 14, curves 107, 108, 109, and 110 denote the results when the CoCrPt hard magnetic layer thickness was 15, 20, 35, and 50 nm, respectively.

FIG. 15 shows that, in Comparative Experiment Example 2, as the hard magnetic layer thickness was decreased, the magnetization recovery ratio lowered, and the pinning failure resistance lowered, and that no satisfactory magnetizing effect was obtained any longer when the hard magnetic layer thickness was 20 nm. In contrast, in Experiment Example 3 as shown in FIG. 14, although the magnetization recovery ratio largely lowered when the hard magnetic layer thickness was decreased to 15 nm, even in the medium in which this hard magnetic layer thickness was 20 nm a high magnetization recovery ratio was maintained up to $H^R$ larger than that in the medium of Comparative Experiment Example 2 in which the thickness was 50 nm.

Note that when the thickness of this CoCrPt hard magnetic layer used is decreased to 20 nm or less, the magnetic characteristics such as the longitudinal coercive force and longitudinal squareness ratio evidently deteriorate. This caused the lowering of the magnetization recovery ratio when the hard magnetic layer thickness was 15 nm in Experiment Example 3. Even when the thickness of the hard magnetic layer is 10 nm or less, if this hard magnetic layer has good magnetic characteristics, it is probably possible to prevent deterioration of the magnetization recovery ratio as shown in FIG. 14. Accordingly, although the minimum value of the hard magnetic layer thickness with which a high recovery ratio can be maintained is 20 nm in Experiment Example 3, this layer thickness can be well decreased to 10 nm or less by taking account of the characteristics of the hard magnetic layer.

This demonstrates that reducing the exchange coupling between the hard and soft magnetic layers by forming a nonmagnetic interlayer such as a Ru layer has the effect of decreasing the thickness of the hard magnetic layer and at the same time preventing the pinning failure by improving the magnetization recovery ratio.

COMPARATIVE EXAMPLE 2

As Comparative Example 2, perpendicular magnetic recording media were manufactured following the same procedures as in Comparative Example 1, except that the thickness of a CoCrPt hard magnetic layer was changed to 50, 35, and 20 nm.

The recording/reproduction characteristics of the obtained magnetic recording media were evaluated by using the spin stand. Consequently, no spike noise was observed in media in which the CoCrPt hard magnetic layer thickness was 50 and 35 nm. However, a plurality of spike noise components were observed in a medium in which the hard magnetic layer thickness was 20 nm, the smallest value. This is presumably because no satisfactory magnetizing effect was obtained, so it was impossible to correctly evaluate the recording/reproduction characteristics. On the other hand, the S/Nm values of the media in which the hard magnetic layer thickness was 50 and 35 nm were 22 and 24 dB, respectively, which were equal to or higher than the value in Comparative Example 1. Accordingly, reducing the hard magnetic layer thickness to some extent has the effect of improving medium noise of the perpendicular magnetic recording medium.

These perpendicular magnetic recording media of Comparative Example 2 were incorporated into HDDs and, after recording and reproduction were performed, removed from the HDDs, and the recording/reproduction characteristics were reevaluated by using the spin stand. As a result, a plurality of spike noise components having substantially the same magnitude as the reproduced signal were observed on the edge of each disk. In Comparative Example 2, therefore, pinning failure on the edge of the disk presumably occurred by a leakage flux from the VCM in the HDD, regardless of the hard magnetic layer thickness.

EXAMPLE 2

As Example 2, perpendicular magnetic recording media were manufactured following the same procedures as in Comparative Example 1, except that the thickness of a CoCrPt hard magnetic layer was changed to 50, 35, 20, and 15 nm. The recording/reproduction characteristics of the obtained magnetic recording media were evaluated by using the spin stand. Consequently, no spike noise was observed in media in which the CoCrPt hard magnetic layer thickness was 50, 35, and 20 nm. However, spike noise was observed a little in a medium in which the hard magnetic layer thickness was 15 nm, the smallest value. This is presumably because the magnetic characteristics of the hard magnetic film used allowed easy occurrence of magnetic deviation, as explained in Experiment Example 3, so it was impossible to well evaluate the recording/reproduction characteristics. On the other hand, the S/Nm values of the media in which the hard magnetic layer thickness was 50, 35, and 20 nm were 22, 24, and 26 dB, respectively, which were equal to or higher than the value in Example 1. Accordingly, reducing the hard magnetic layer thickness to some extent has the effect of reducing the medium noise of the perpendicular magnetic recording medium.

These perpendicular magnetic recording media of Comparative Example 2 were incorporated into HDDs and, after recording and reproduction were performed, removed from the HDDs, and the recording/reproduction characteristics were reevaluated by using the spin stand. As a result, no spike noise was observed like before the recording and reproducing operations, and no particular deterioration of any other recording/reproduction characteristics was observed, except for the medium in which the hard magnetic layer thickness was 15 nm. From the foregoing, in the media of Example 2 except for the one in which the hard magnetic layer thickness was 15 nm, probably no pinning failure by a leakage flux from the VCM in the HDD occurred.

In Comparative Example 2, spike noise was observed and pinning failure occurred in the media in which the hard magnetic layer thickness was 50 to 20 nm. In Example 2, however, neither spike noise nor pinning failure was observed in the corresponding media. Accordingly, improving the pinning failure resistance by reducing the exchange coupling between the hard and soft magnetic layers and at the same time decreasing the thickness of the hard magnetic layer have the effect of suppressing the spike noise in the perpendicular magnetic recording medium and preventing the pinning failure.

EXPERIMENT EXAMPLE 4

Figure 16:
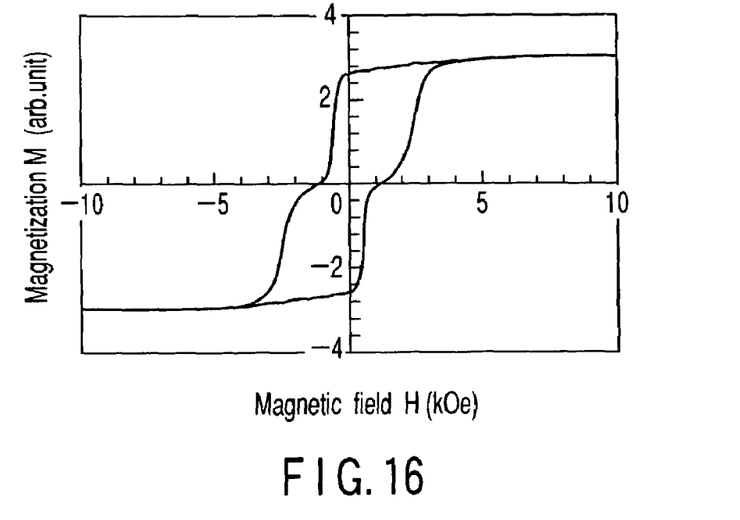
FIG. 16 is a graph showing magnetization curves of another sample according to the present invention.

A sample was manufactured following the same procedures as in Experiment Example 1, except that the thickness of a CoZrNb soft magnetic layer was 20 nm. FIG. 16 shows the result of measurement of magnetization curves in the longitudinal direction of the film of the obtained sample by using the VSM. These magnetization curves are basically the same as those shown in FIG. 6 in that the hard magnetic layer underwent magnetic reversal after most of the soft magnetic layer underwent magnetic reversal. However, a portion corresponding to the soft magnetic layer increased its coercive force exhibited no satisfactory soft magnetic characteristics any longer.

EXAMPLE 3 & EXPERIMENT EXAMPLE 5

Perpendicular magnetic recording media were manufactured following the same procedures as in Examples 1 and 2, and samples were manufactured following the same procedures as in Experiment Examples 1 to 4, except that V, Cr, Cu, Mo, and Rh were used instead of the Ru nonmagnetic interlayer. When similar experiments were conducted, substantially the same results were obtained except for the dependence of $Hc^{Hard}$ upon the nonmagnetic layer thickness. That is, in any of these media, $Hc^{Hard}$ saturated when the nonmagnetic layer thickness was 0.6 to 0.7 nm, which was smaller than when Ru was used.

Accordingly, a preferred range of the nonmagnetic interlayer thickness with which both the magnetizing effect and pinning failure resistance are achieved is probably 0.3 to 0.5 nm.

EXAMPLE 4 & EXPERIMENT EXAMPLE 6

Perpendicular magnetic recording media were manufactured following the same procedures as in Examples 1 and 2 and Experiment Examples 1 to 4, except that Co was added to the Ru nonmagnetic interlayer to form a CoRu alloy interlayer. When similar experiments were conducted, substantially the same results were obtained.

However, when nonmagnetic Co-40at. % Ru was checked for the dependence of $Hc^{Hard}$ upon the CoCr alloy layer thickness, $Hc^{Hard}$ saturated when the CoCr alloy layer thickness was about 5 nm, which was larger than when Ru was used. To achieve the magnetization strength and the magnetization recovery ratio at the same time, a preferred Co-containing alloy nonmagnetic interlayer thickness is probably 1 to 5 nm.

In addition, the content of Co was increased to apply a weak saturation magnetization of 10 to 60 emu/cm³. Consequently, as the Co amount increased, i.e., as the saturation magnetization increased, the layer thickness of saturation also increased, but the basic tendency remained unchanged. That is, it was well possible to achieve the magnetizing effect and pinning failure resistance at the same time.

EXAMPLE 5 & EXPERIMENT EXAMPLE 7

Perpendicular magnetic recording media were manufactured following the same procedures as in Examples 1 and 2 and Experiment Examples 1 to 4, except that a CoCr alloy interlayer was used instead of the Ru nonmagnetic interlayer. When similar experiments were conducted, substantially the same results were obtained.

However, when nonmagnetic Co-40at. % Cr was checked for the dependence of $Hc^{Hard}$ upon the CoCr alloy layer thickness, $Hc^{Hard}$ saturated when the CoCr alloy layer thickness was about 5 nm, which was larger than when Ru was used. To achieve the magnetization strength and magnetization recovery ratio at the same time, a preferred Co-containing alloy nonmagnetic interlayer thickness is probably 1 to 5 nm.

In addition, the content of Co was increased to apply a weak saturation magnetization of 10 to 60 emu/cm³. Consequently, as the Co amount increased, i.e., as the saturation magnetization increased, the layer thickness of saturation also increased, but the basic tendency remained unchanged. That is, it was well possible to achieve the magnetizing effect and pinning failure resistance at the same time.

Furthermore, similar results were obtained when Pt, B, and Ta were added to the CoCr alloy interlayer.

Also, the saturation magnetization of the CoCrPt hard magnetic layer used in the example was about 240 emu/cc. Therefore, good characteristics are presumably obtained when the saturation magnetization of the weak magnetic interlayer is ¼ that of the hard magnetic layer or less. Although no experiment was conducted for an interlayer having a saturation magnetization of 60 emu/cm³ or more, it is in principle probably possible to obtain similar effects when the saturation magnetization is smaller than that of the hard magnetic layer.

The above results indicate that the optimum film thickness when a weak magnetic material given a little magnetism is used as an interlayer is larger than that when a nonmagnetic material is used as an interlayer.

EXAMPLE 6

A perpendicular magnetic recording medium was manufactured following the same procedures as in Example 1, except that instead of the Ru nonmagnetic interlayer, an oxide layer was formed between a longitudinal hard magnetic layer and a longitudinal soft magnetic layer by oxidizing the surface of the longitudinal hard magnetic layer by supplying oxygen into the chamber after this longitudinal hard magnetic layer was multilayered.

The recording/reproduction characteristics of the obtained magnetic recording medium were evaluated by using the spin stand. Consequently, no spike noise was observed over the entire disk surface, and the S/Nm value was 22 dB, which was equivalent to the value in Example 1.

This perpendicular magnetic recording medium was incorporated into an HDD and, after recording and reproduction were performed, removed from the HDD, and the recording/reproduction characteristics were reevaluated by using the spin stand. As a result, no spike noise was observed like before the recording and reproducing operations, and no particular deterioration of any other recording/reproduction characteristics was observed. From the foregoing, probably no pinning failure by a leakage flux from the VCM in the HDD occurred in this media.

On the edge of the disk, therefore, spike noise caused by pinning failure was observed in Comparative Example 1 and was not observed in Example 6. Accordingly, forming the oxide layer between the longitudinal hard magnetic layer and longitudinal soft magnetic layer has the effect of preventing pinning failure in the perpendicular magnetic recording medium.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:
    a substrate,
    a longitudinal hard magnetic layer formed on said substrate,
    a nonmagnetic layer formed in contact with said longitudinal hard magnetic layer, and mainly containing cobalt,
    a longitudinal soft magnetic layer formed on said nonmagnetic layer, and
    a perpendicular magnetic recording layer formed on said longitudinal soft magnetic layer.

2. A medium according to claim 1, wherein said nonmagnetic layer further contains ruthenium.

3. A medium according to claim 1, wherein said nonmagnetic layer further contains chromium.

4. A medium according to claim 1, wherein said nonmagnetic layer has a thickness of 1 to 5 nm.

5. A medium according to claim 1, wherein said longitudinal hard magnetic layer has a thickness of 5 to 50 nm.

6. A perpendicular magnetic recording medium comprising:
    a substrate,
    a longitudinal hard magnetic layer formed on said substrate,
    a nonmagnetic layer formed in contact with said longitudinal hard magnetic layer and mainly containing ruthenium,
    a longitudinal soft magnetic layer formed in contact with said nonmagnetic layer, and
    a perpendicular magnetic recording layer formed on said longitudinal soft magnetic layer.

7. A medium according to claim 6, wherein said nonmagnetic layer has a thickness of 0.5 to 0.9 nm.

8. A medium according to claim 6, wherein said longitudinal hard magnetic layer has a thickness of 5 to 50 nm.

9. A perpendicular magnetic recording medium comprising:
    a substrate,
    a longitudinal hard magnetic layer formed on said substrate,
    a nonmagnetic layer formed in contact with said longitudinal hard magnetic layer and having a thickness of 0.3 to 0.5 nm,
    a longitudinal soft magnetic layer formed in contact with said nonmagnetic layer, and
    a perpendicular magnetic recording layer formed on said longitudinal soft magnetic layer.

10. A medium according to claim 9, wherein said nonmagnetic layer contains at least one element selected from the group consisting of vanadium, chromium, copper, molybdenum, and rhodium.

11. A medium according to claim 9, wherein said longitudinal hard magnetic layer has a thickness of 5 to 50 nm.

12. A magnetic recording/reproducing apparatus comprising:
    a perpendicular magnetic recording medium comprising a substrate, a longitudinal hard magnetic layer formed on said substrate, a nonmagnetic layer formed in contact with said longitudinal hard magnetic layer and mainly containing cobalt, a longitudinal soft magnetic layer formed on said nonmagnetic layer, and a perpendicular magnetic recording layer formed on said longitudinal soft magnetic layer;
    a driving mechanism which supports and rotates said perpendicular magnetic recording medium;
    a magnetic head having an element which records information on said perpendicular magnetic recording medium, and an element which reproduces recorded information, and
    a carriage assembly which supports said magnetic head such that said magnetic head freely moves with respect to said perpendicular magnetic recording medium.

13. A magnetic recording/reproducing apparatus comprising:
    a perpendicular magnetic recording medium comprising a substrate, a longitudinal hard magnetic layer formed on said substrate, a nonmagnetic layer formed in contact with said longitudinal hard magnetic layer and mainly containing ruthenium, a longitudinal soft magnetic layer formed in contact with said nonmagnetic layer, and a perpendicular magnetic recording layer formed on said longitudinal soft magnetic layer;
    a driving mechanism which supports and rotates said perpendicular magnetic recording medium;
    a magnetic head having an element which records information on said perpendicular magnetic recording medium, and an element which reproduces recorded information, and
    a carriage assembly which supports said magnetic head such that said magnetic head freely moves with respect to said perpendicular magnetic recording medium.

14. A magnetic recording/reproducing apparatus comprising:
    a perpendicular magnetic recording medium comprising a substrate, a longitudinal hard magnetic layer formed on said substrate, a nonmagnetic layer formed in contact with said longitudinal hard magnetic layer and having a thickness of 0.3 to 0.5 nm, a longitudinal soft magnetic layer formed in contact with said nonmagnetic layer, and a perpendicular magnetic recording layer formed on said longitudinal soft magnetic layer;
    a driving mechanism which supports and rotates said perpendicular magnetic recording medium;
    a magnetic head having an element which records information on said perpendicular magnetic recording medium, and an element which reproduces recorded information, and
    a carriage assembly which supports said magnetic head such that said magnetic head freely moves with respect to said perpendicular magnetic recording medium.

15. A medium according to claim 6, wherein said longitudinal hard magnetic layer includes alloy containing Co, Cr, and Pt as main components.

16. A medium according to claim 6, wherein said longitudinal soft magnetic layer has a thickness of 20 to 500 nm.

17. A medium according to claim 6, wherein said longitudinal hard magnetic layer and said longitudinal soft magnetic layer are ferromagnetically coupled.

18. A medium according to claim 9, wherein said longitudinal hard magnetic layer includes alloy containing Co, Cr, and Pt as main components.

19. A medium according to claim 9, wherein said longitudinal soft magnetic layer has a thickness of 20 to 500 nm.

20. A medium according to claim 9, wherein said longitudinal hard magnetic layer and said longitudinal soft magnetic layer are ferromagnetically coupled.

* * * * *